US006741590B1

(12) United States Patent
Duke et al.

(10) Patent No.: US 6,741,590 B1
(45) Date of Patent: *May 25, 2004

(54) METHOD AND APPARATUS FOR MANAGING A SUBTENDED COMMUNICATION NETWORK

(75) Inventors: James P. Duke, Cedar Park, TX (US); Marco J. Matchefts, Austin, TX (US); Robert C. Taylor, Austin, TX (US); Rachel Neal, Austin, TX (US); Ronald A. Pleshek, Austin, TX (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,246

(22) Filed: Jul. 8, 1999

(51) Int. Cl.[7] .............................................. H04L 12/28
(52) U.S. Cl. ..................... 370/389; 370/389; 370/392; 370/466
(58) Field of Search ................ 370/389, 392, 370/401, 466; 709/223, 224, 225; 345/736; 714/4

(56) References Cited

U.S. PATENT DOCUMENTS

| | | | | |
|---|---|---|---|---|
| 5,210,530 A | | 5/1993 | Kammerer et al. | 340/825.08 |
| 5,509,123 A | * | 4/1996 | Dobbins | 395/200.15 |
| 5,621,721 A | | 4/1997 | Vatuone | 370/16 |
| 5,678,006 A | | 10/1997 | Valizadeh et al. | 395/200.02 |
| 6,145,001 A | * | 11/2000 | Scholl | 709/223 |
| 6,370,653 B1 | * | 4/2002 | Ichinohe et al. | 714/4 |

* cited by examiner

Primary Examiner—Dang Ton
Assistant Examiner—Robert W. Wilson
(74) Attorney, Agent, or Firm—Baker Botts L.L.P.

(57) ABSTRACT

A subtended communication network includes a first node servicing a plurality of first subscribers and having a subtend module and a corresponding first identifier. The first node can store a second identifier corresponding to a second node coupled to the subtend module. The subtended communication network also includes a second node servicing a plurality of second subscribers and having a network interface module and corresponding second identifier. The second node can store the first identifier corresponding to the first node coupled to the network interface module. The subtended communication network further includes a management module coupled to the first node and the second node. The management module can determine a subtending relationship between the first node and the second node by retrieving the first identifier from the second node and the second identifier from the first node.

41 Claims, 6 Drawing Sheets

FIG. 3A

| NODE 100c | | | | | | NODE 100a | | | | | |
|---|---|---|---|---|---|---|---|---|---|---|---|
| SUBSCRIBER SIDE | | | NIM SIDE | | | STM SIDE | | | NETWORK SIDE | | |
| PORT | VPI | VCI | PORT | VPI | VCI | PORT | VPI | VCI | PORT | VPI | VCI |
| 1 | 1 | 0 | 1 | 7 | 32 | 2 | 7 | 32 | 3 | 4 | 23 |
| 1 | 1 | 1 | 1 | 6 | 31 | 2 | 6 | 31 | 1 | 1 | 101 |
| 1 | 1 | 2 | 1 | 4 | 201 | 2 | 4 | 201 | 1 | 0 | 8 |
| 1 | 1 | 3 | 1 | 1 | 151 | 2 | 1 | 151 | 1 | 11 | 42 |
| ⋮ | ⋮ | ⋮ | ⋮ | ⋮ | ⋮ | ⋮ | ⋮ | ⋮ | ⋮ | ⋮ | ⋮ |
| 400 | 1 | 2 | 1 | 6 | 4 | 2 | 6 | 4 | 2 | 62 | 38 |
| 400 | 1 | 3 | 1 | 0 | 151 | 2 | 0 | 151 | 28 | 19 | 121 |

FIG. 3B

| NODE 100f | | | | | | NODE 100c | | | | | |
|---|---|---|---|---|---|---|---|---|---|---|---|
| SUBSCRIBER SIDE | | | NIM SIDE | | | STM SIDE | | | NIM SIDE | | |
| PORT | VPI | VCI | PORT | VPI | VCI | PORT | VPI | VCI | PORT | VPI | VCI |
| 1 | 1 | 0 | 1 | 1 | 18 | 2 | 1 | 18 | 1 | 1 | 8 |
| 1 | 1 | 1 | 1 | 7 | 32 | 2 | 7 | 32 | 8 | 7 | 34 |
| ⋮ | ⋮ | ⋮ | ⋮ | ⋮ | ⋮ | ⋮ | ⋮ | ⋮ | ⋮ | ⋮ | ⋮ |
| 400 | 1 | 3 | 1 | 0 | 254 | 2 | 0 | 254 | 4 | 255 | 181 |

FIG. 5

| NODE | IDENTIFIER | NPID #1 | NPID #2 | SPID |
|---|---|---|---|---|
| 100a | 123.89.11.6 | 149.41.8.2 | 95.8.4.80 | 0 |
| 100b | 149.41.8.2 | 102.8.81.41 | 21.1.82.72 | 123.89.11.6 |
| 100d | 102.8.81.41 | 0 | 0 | 149.41.8.2 |
| 100c | 95.8.4.80 | 0 | 111.222.11.8 | 123.89.11.6 |
| ⋮ | ⋮ | ⋮ | ⋮ | ⋮ |
| 100e | 21.1.82.72 | 0 | 0 | 149.41.8.2 |

| CONDITION | IDENTIFIERS STORED | | IDENTIFIERS USED |
|---|---|---|---|
| | NODE | MANAGEMENT MODULE | |
| 1 | ✓ | X | NODE |
| 2 | X | ✓ | MANAGEMENT MODULE |
| 3 | ✓ = ✓ | | STATUS QUO |
| 4 | ✓ ≠ ✓ | | SET TRAP |

METHOD AND APPARATUS FOR MANAGING A SUBTENDED COMMUNICATION NETWORK

TECHNICAL FIELD OF THE INVENTION

This invention relates to communication networks, and more particularly to a method and apparatus for managing a subtended communication network.

BACKGROUND OF THE INVENTION

A digital subscriber line (xDSL) multiplexer provides communication service between subscribers and a communication network. When the xDSL multiplexer can no longer handle additional subscribers, a second xDSL multiplexer may couple to the first xDSL multiplexer such that the second xDSL multiplexer communicates with the communication network through the first xDSL multiplexer. The two xDSL multiplexers are now in a subtending relationship. Coupling the second xDSL multiplexer to the first xDSL multiplexer increases the number of subscribers serviced without having to establish another connection to the communication network.

When two, or more, xDSL multiplexers couple together in a subtending relationship, it becomes important to provision the address space used by each xDSL multiplexer to prevent conflicting use of the same addresses. To effectively provision the address spaces, however, it is necessary to first know the subtending relationship between the xDSL multiplexers.

SUMMARY OF THE INVENTION

The present invention substantially reduces or eliminates at least some of the disadvantages and problems associated with managing digital subscriber line (xDSL) multiplexers in subtending relationships. The present invention provides a communication network that allows a management module, and other management modules, to discover the subtending relationship between xDSL multiplexers in a subtending relationship by synchronizing with information stored in the xDSL multiplexers.

In one embodiment of the present invention, a subtended communication network includes a first node servicing a plurality of first subscribers and having a subtend module and a corresponding first identifier. The first node is operable to store a second identifier corresponding to a second node coupled to the subtend module. The communication network also includes a second node servicing a plurality of second subscribers and having a network interface module and corresponding second identifier. The second node is operable to store the first identifier corresponding to the first node coupled to the network interface module. The communication network further includes a management module coupled to the first node and the second node. The management module is operable to determine a subtending relationship between the first node and the second node by retrieving the first identifier from the second node and the second identifier from the first node.

In another embodiment, a node coupled to a subtended node in a subtended communication network includes a plurality of subscriber ports coupled to a plurality of subscribers receiving communication service from the node. The node also includes a subtend module coupled to a subtended node and operable to store an identifier for the subtended node. The node further includes a network interface module coupled to a data network. In addition, the node includes a switch operable to receive first subscriber data from the subscriber ports and second subscriber data from the subtend module and to communicate the first subscriber data and the second subscriber data to the network interface module for communication over the data network.

The present invention has several important technical features and advantages. First, because each node stores identifiers for the nodes adjacent to it, meaning the nodes coupled to it as either subtended or subtending nodes, a management module may determine the subtending relationship between all of the nodes in the network upon the discovery of only one of the nodes. This avoids a manual configuration of the subtending relationship in the management module. Determining the subtending relationship between all of the nodes allows efficient management of the subtended communication network. Also because each node stores identifiers for adjacent nodes, the management module can use the identifiers stored at a node to establish or replace identifiers stored for the node at the management module. This form of synchronization may be necessary when the management module first discovers a node or when the identifiers already stored for the node at the management module become corrupted. Further, because the management module stores identifiers for adjacent nodes, the management module may replace the identifiers stored at a node with the identifiers stored at the management module for the node. This form of synchronization may be necessary if the identifiers stored at the node become corrupted or upon replacement of one of the nodes. In addition, because of the storage of the identifiers for adjacent nodes at each node, if a second management module with no knowledge of the subtending relationship discovers any one of the nodes, the second management module can determine the subtending relationship between the nodes without assistance from the first management module. Thus, the second management module does not have to undergo a manual configuration. Other technical advantages will be readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which:

FIG. 3A shows a representative mapping table of communication paths between subscribers of a middle level node and a data network;

FIG. 3B shows a representative mapping table of communication paths between subscribers of a lower level node and the middle level node;

FIG. 5 shows a table that illustrates the content of a node relationship database;

DETAILED DESCRIPTION OF THE INVENTION

Figure 1A:
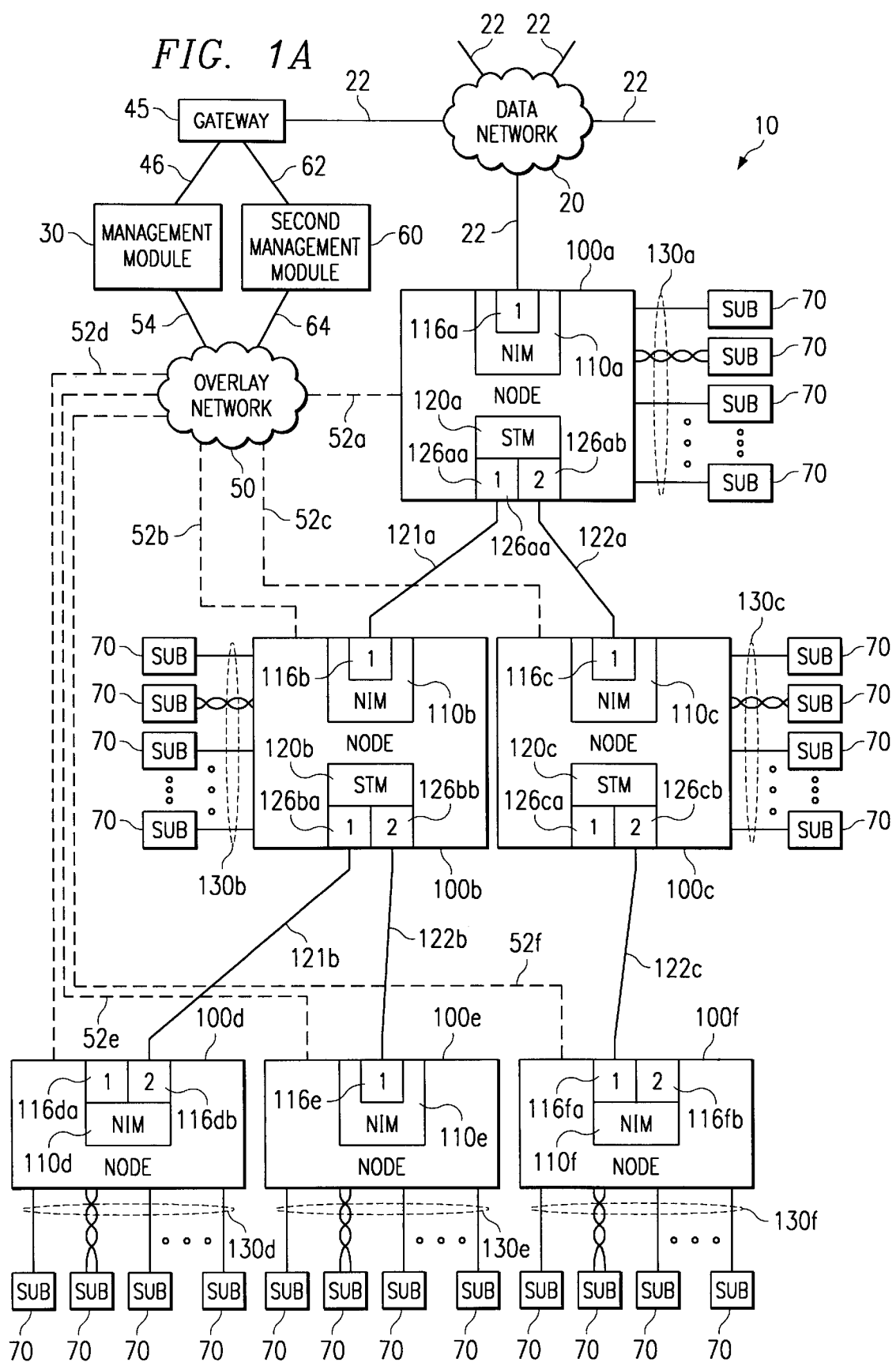
FIG. 1A provides an overview of a subtended communication network.

FIG. 1A provides an overview of a subtended communication network 10. Subtended communication network 10 includes a number of nodes 100a, 100b, 100c, 100d, 100e, and 100f (generally referred to as nodes 100) coupled together in a hierarchical order. Node 100a is a subtending node because it subtends nodes 100b and 100c, making nodes 100b and 100c subtended nodes. Nodes 100b and 100c are also subtending nodes because node 100b subtends nodes 100d and 100e and node 100c subtends node 100f. Because nodes 100d, 100e, and 100f are at the bottom of the hierarchy, they are only subtended nodes. Nodes 100 are coupled to a data network 20 using one of links 22. Data network 20 may be an asynchronous transfer mode (ATM) network, the Internet, a frame relay network, a wide area network (WAN), or any other combination of hardware and/or software that communicates data.

Each node 100 may couple with other nodes 100 that it subtends, other nodes 100 that it is subtended by, and/or data network 20. Nodes 100 also couple to subscribers 70 to provide communication service using links 130a, 130b, 130c, 130d, 130e, and 130f (generally referred to as links 130), respectively. Subscribers 70 could be home or business users desiring to communicate data, voice, image, and/or video information (generally referred to as data) with data network 20. Links 130 may represent twisted pair line for digital subscriber line (xDSL) communication, coaxial cable, Ethernet connections, or any other suitable hardware and/or software and supported protocol to provide data service to subscribers 70.

Each node 100 includes a network interface module (NIM) 110a, 110b, 110c, 110d, 110e, and 110f (generally referred to as NIMs 110), respectively. Each NIM 110 contains one or more ports 116 (116a, 116b, 116c, 116da, 116db, 116e, 116fa, 116fb in FIG. 1A). Each NIM 110 couples respective node 100 to its subtending nodes 100, or nodes 100 higher in the hierarchical order, and/or with data network 20. Nodes 100a, 100b, and 100c further have a subtend module (STM) 120a, 120b, and 120c (generally referred to as STMs 120), respectively. Each STM 120 contains one or more ports 126 (126aa, 126ab, 126ba, 126bb, 126ca, 126cb, in FIG. 1A) to which ports 116 of NIMs 110 may be coupled either directly or through a data network, such as data network 20. Each STM 120 couples its respective node 100 to its subtended nodes 100, or nodes 100 lower in the hierarchical order. Note, although nodes 100d, 100e, and 100f do not have STMs, such as STMs 120, installation of STMs like STMs 120 would be a simple matter if the subtending hierarchy expands beyond three levels.

As illustrated in FIG. 1A, node 100a couples to node 100b through port 126aa of STM 120a using a link 121a to port 116b of NIM 110b and to node 100c through port 126ab of STM 120a using a link 122a to port 116c of NIM 110c. Node 100b, in turn, couples to node 100d through port 126ba of STM 120b using a link 121b to port 116da of NIM 110d and to node 100e through port 126bb of STM 120b using a link 122b to port 116e of NIM 110e.

Figure 1B:
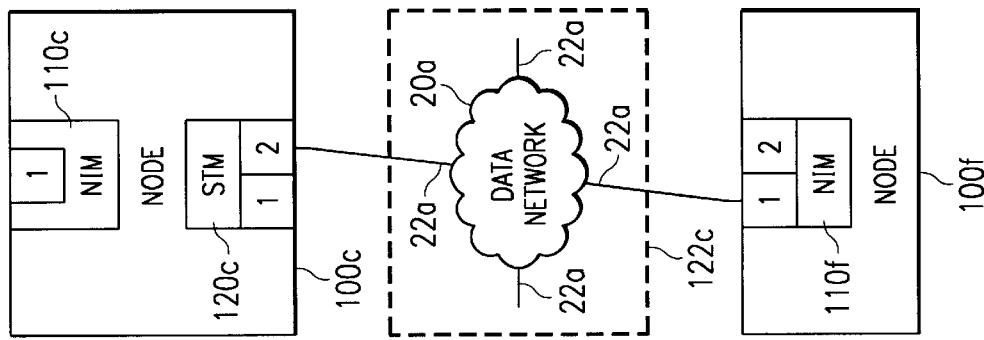
FIG. 1B illustrates a coupling between nodes in a subtended communication network.

Also, node 100c couples to node 100f through port 126cb of STM 120c using a link 122c to port 116fa of NIM 110f. Note, links 121 and 122 may be direct physical connections between two nodes 100, or as shown in FIG. 1B, may include an interconnection by links 22a through one or more data networks 20a, which could be similar to or the same as data network 20.

Subtended communication network 10 also includes a management module 30 for managing nodes 100. Management module 30 can communicate with nodes 100 in subtended communication network 10 through data network 20 and/or through an overlay network 50. To communicate with nodes 100 through data network 20, management module 30 uses a link 46 to communicate with a gateway 45, which communicates with data network 20 using one or more of links 22. To communicate with nodes 100 through overlay network 50, management module 30 uses a link 54 that couples to overlay network 50, which in turn couples to each node 100 by links 52a, 52b, 52c, 52d, 52e, and 52f (generally referred to as links 52), respectively. Overlay network 50 can be an Ethernet network, an Internet protocol (IP) network, a wide area network (WAN), or any other type of communication network that allows communication of management data between management module 30 and nodes 100. Management module 30 can manage nodes 100 using any variety of management protocols, such as, for example, simple network management protocol (SNMP), remote monitoring (RMON) protocol, or common management information protocol (CMIP), or through proprietary protocols such as a command line interface.

Subtended communication network 10 can also include a second management module 60. Second management module 60 can communicate and manage nodes 100 in the same manner as management module 30, using a link 62 to gateway 45 and/or a link 64 to overlay network 50. In certain embodiments, management module 30 can discover any changes made by second management module 60 to nodes 100, and second management module 60 can discover any changes made by management module 30 to nodes 100. In a particular embodiment, second management module 60 can be a redundant server.

In operation, each node 100 communicates data with subscribers 70, any subtending nodes 100, any subtended nodes 100, and/or data network 20. Nodes 100d, 100e, and 100f communicate data received from subscribers 70 to data network 20 by sending the data to NIMs 110d, 110e, and 110f, respectively. NIMs 110d, 110e, and 110f communicate data from nodes 100d, 100e, and 100f, respectively, to nodes 100b and 100c using links 121b, 122b, and 122c, respectively.

Nodes 100b and 100c receive data from nodes 100d, 100e, and 100f through STMs 120b and 120c, respectively.

Node 100b receives data from node 100d through port 126ba of STM 120b and from node 100e through port 126bb of STM 120b. Node 100c receives data from node 100f through port 126cb of STM 120c. Note, although a node, such as one of nodes 100, does not currently couple to port 126ca of STM 120c, a node like one of nodes 100 could easily couple to port 126ca of STM 120c. Node 100b also communicates with subscribers 70, and node 100c also communicates with subscribers 70. Node 100b communicates data received from subscribers 70, data received from node 100d, and data received from node 100e to NIM 110b. Node 100c communicates data received from subscribers 70 and from node 100f to NIM 110c. NIM 110b and 110c communicate data to STM 120a of node 100a using links 121a and 122a, respectively.

Node 100a receives data from node 100b through port 126aa of STM 120a and from node 100c through port 126ab of STM 120*a*. Node 100*a* also receives data from subscribers 70 of node 100*a*. Node 100*a* communicates data received from node 100*b*, from node 100*c*, and from subscribers 70 through port 116*a* of NIM 110*a* to data to data network 20.

For data destined for one of subscribers 70 of one of nodes 100 from data network 20, node 100*a* receives the data first, through port 116*a* of NIM 110*a*. Node 100*a* then routes the data to one of subscribers 70 of node 100*a*, if the data is destined for one of subscribers 70 of node 100*a*, to node 100*b*, or to node 100*c*. If, for example, the data is destined for one of subscribers 70 of node 100*c* or one of subscribers 70 of node 100*f*, node 100*c* receives the data from port 126*ab* of STM 120*a* through port 116*c* of NIM 110*c*. If destined for one of subscribers 70 of node 100*c*, node 100*c* routes the data to that subscriber 70 of node 100*c*. If the data is not destined for one of subscribers 70 of node 100*c*, node 100*c* routes the data to node 100*f*. Node 100*f* will then route the data to one of subscribers 70 of node 100*f*.

Because each node 100 communicates data from subscribers 70 along with data received from any subtended nodes 100, and because each node 100 receives data from data network 20 for subscribers 70 and for any subtended nodes 100, provisioning of the communication paths in each node 100 is critical for the operation of subtended communication network 10. The address space of each node 100 is composed of all of the communications paths available for that node 100. Proper provisioning of the communication paths ensures proper routing of data destined for subscribers 70 of one of nodes 100 and subtended nodes 100 of that node 100. Note, by assuring that data will pass properly from data network 20 through nodes 100 to each of subscribers 70, data will also pass properly from each subscriber 70 to data network 20 through nodes 100. Of course, proper provisioning of the communication paths for nodes 100 depends on knowing where nodes 100 are in the subtending relationship. Thus, because the mapping of the communication paths in each node 100 must be provisioned correctly, and because proper provisioning depends on knowing the position of each node 100 in the subtending relationship, knowing the position of each node 100 in the hierarchy of nodes 100 is essential.

Knowing the position of each node 100 in the hierarchy of nodes 100 can also be important for managing the bandwidth of each node 100, to ensure proper bit rates for subscribers 70. For example, in embodiments where at least some of nodes 100 are to provide constant bit rate (CBR) or variable bit rate (VBR) service to at least some of subscribers 70, it is important to make sure that it is possible to achieve those bit rates in view of the capabilities of and requirements on each node 100 in the subtending relationship. In embodiments where nodes 100 provide only unspecified bit rate (UBR) or available bit rate (ABR) service to subscribers 70, however, the bandwidth considerations are much less important than the provisioning considerations.

Typically, a node, such as one of nodes 100, only stores information about itself, such as its network identifier. Thus, a node does not store any information about the other nodes to which it is coupled as a subtending or a subtended node. Thus, a management module, such as management module 30, could not determine the subtending relationship between nodes in a subtending relationship upon discovery of one of the nodes. Also, even after a first management module was provided with the subtending relationship, other management modules, such as second management module 60, could not determine the subtending relationship upon discovery of one of the nodes.

Subtended communication network 10 allows for the determination of the position of each node 100 in the subtending relationship by storing identifiers in each node 100 for nodes 100 that each node 100 subtends or is subtended by. The storing of these identifiers in nodes 100 provisions the subtending relationship. Note, because a management module, such as management module 30 or second management module 60, that does not know the subtending relationship may first discover any one of nodes 100, it is important to store identifiers at each node 100 for every node 100 that node 100 subtends or is subtended by. Having both sets of identifiers will allow discovery up and down the hierarchal order, thus allowing discovery of all nodes 100 in subtended communication network 10.

In operation, nodes 100 will allow the storage of the identifiers of adjacent nodes 100 during installation, or preprovisioning of the subtending relationship, or after installation by management module 30, or provisioning the subtending relationship. After installation of nodes 100 in subtended communication network 10 and storage of the identifiers in nodes 100, management module 30 can then discover automatically or autonomously the subtending relationship between nodes 100 by examining the identifiers in each node 100, avoiding the manual provisioning process. If nodes 100 were preprovisioned, management module 30 can retrieve is the identifiers from each node 100. If, at a later time, the identifiers that specify the subtending relationship in management module 30 become corrupted, management module 30 can synchronize with nodes 100 by retrieving the identifiers stored in one or all of nodes 100. On the other hand, if the identifiers in one or all of nodes 100 become corrupted, management module 30 can send the identifiers stored at management module 30 to any corrupted nodes 100. In addition, if a new node 100 is installed to replace a malfunctioning node 100, management module 30 can send the identifiers to new node 100 to establish its position in the subtending relationship. Also, another management module, such as second management module 60, can discover the subtending relationship between nodes 100 by retrieving the identifiers from each node 100.

In certain embodiments, STMs 120 can have a number of ports. Accordingly, each node 100 can have a number of subtended nodes 100. NIMs 110 can also have a number of ports, allowing each node 100 to be subtended by more than one of nodes 100. Thus, nodes 100 of subtended communication network 10 may couple together in a variety of arrangements.

Figure 2:
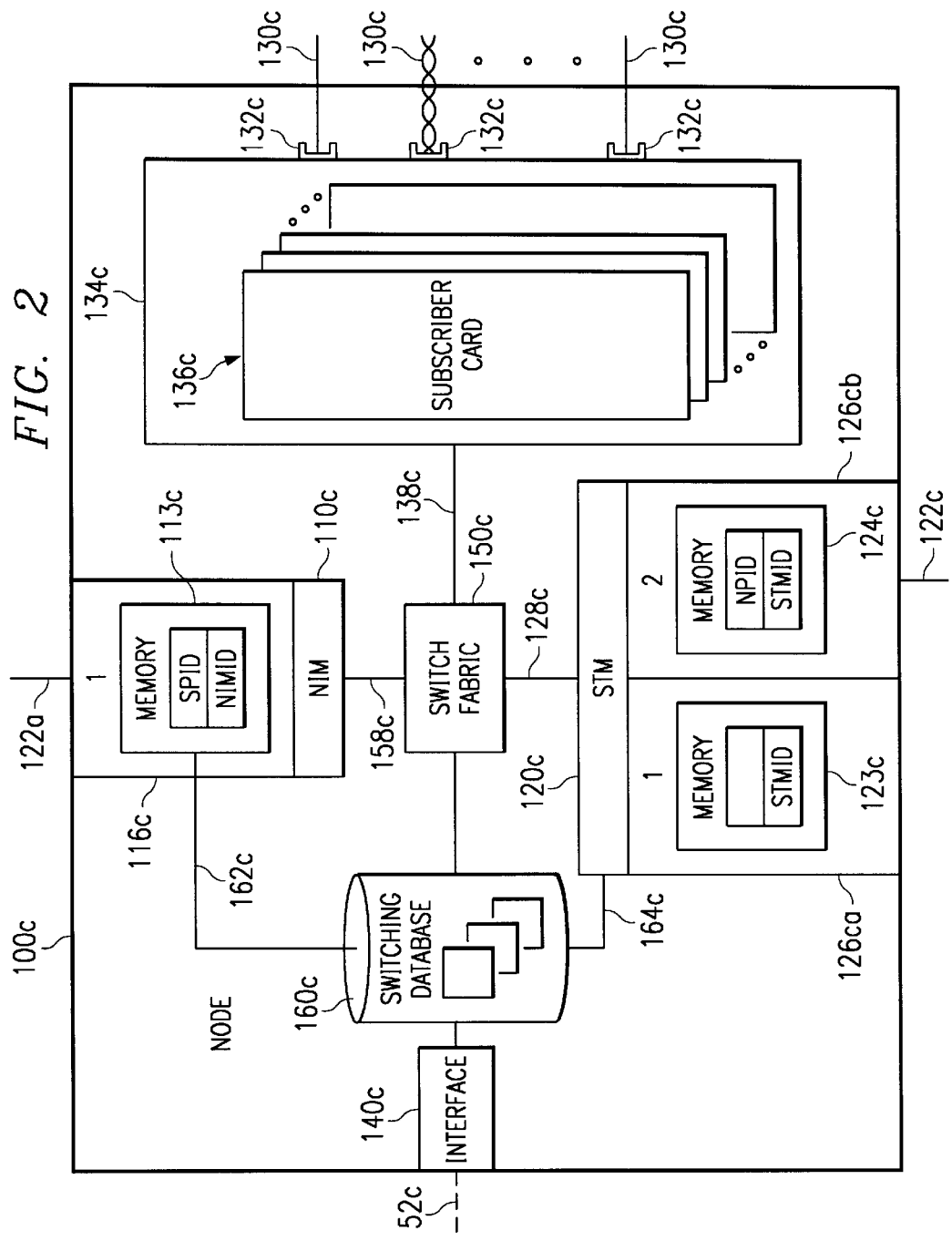
FIG. 2 provides a detailed view of a node in the subtended communication network.

FIG. 2 provides a detailed view of node 100*c* of subtended communication network 10. Node 100*c* is exemplary of other nodes 100. As mentioned previously, a plurality of subscribers 70 (not shown) couple to node 100*c* by links 130*c*. Links 130*c* can be shielded twisted pair (STP) copper wire, unshielded twisted pair (UTP) copper wire, fiber optic cable, microwave transmission paths, coaxial cable, or any other communication link by which node 100*c* can communicate data with subscribers 70. Links 130*c* terminate at subscriber ports 132*c* of a subscriber card bank 134*c*. In particular embodiments, node 100*c* has four hundred subscriber ports 132*c* and, thus, can provide service to four hundred subscribers 70. Subscriber card bank 134*c* includes a number of subscriber cards 136*c*. Subscriber cards 136*c* communicate data with subscribers 70 of node 100*c* and a switch fabric 150*c*, transforming the data between forms appropriate for data network 20 and subscribers 70. Note, subscriber cards 136*c* may have one or more modems with which to communicate with subscribers 70 over links 130*c*. Subscriber card bank 134*c* communicates data with switch fabric 150c using a link 138c. Node 100c also includes subtend module (STM) 120c.

STM 120c communicates data with other nodes 100 that node 100c subtends, for example, node 100f in the arrangement illustrated in FIG. 1A. STM 120c contains two ports 126ca and 126cb, each having a memory 123c and 124c, respectively, storing an identifier associated with one of nodes 100 that node 100c subtends. Memories 123c and 124c also store an identifier for STM 120c and can be random access memory (RAM), a hard disk, a CD-ROM, other magnetic storage media or optical storage media, or any other type of volatile or non-volatile memory. Because STMs 120 couple to NIMs 110, the identifiers stored in STMs 120 are known as network port identifiers (NPIDs). Thus, the NPID in memory 124c of STM 120c is an identifier for port 116fa of NIM 110f. STM 120c also couples to switch fabric 150c, using a link 128c.

Switch fabric 150c routes data received from subscriber card bank 134c and STM 120c to network interface module (NIM) 110c using a link 158c. Switch fabric 150c also routes data received from NIM 110c to subscriber card bank 134c and STM 120c. Switch fabric 150c performs the first routing by mapping the communication path for the data on link 138c to a new communication path on link 158c and by mapping the communication path for the data on link 128c to a new communication path on link 158c. Switch fabric 150c performs the second routing by mapping the communication path for the data on link 158c to a new communication path on link 128c or link 138c. Links 128c, 138c, and 158c may be implemented in hardware or software.

NIM 110c contains one port 116c, having a memory 113c that stores an identifier for NIM 110c and an identifier associated with one of nodes 100 that subtends node 100c, node 100a in the arrangement illustrated in FIG. 1A. Because NIMs 110 couple to STMs 120, the identifier for subtending nodes 100 stored in NIMs 110 are known as subtend port identifiers (SPIDs). Thus, the SPID in memory 113c of NIM 110c is an identifier for port 126ab of STM 120a. Memory 113c can be random access memory (RAM), a hard disk, a CD-ROM, other magnetic storage media or optical storage media, or any other type of volatile or non-volatile memory. NIM 110c communicates with node 100a using link 122a.

Node 100c also includes switching database 160c. Switching database 160c stores the mapping between communication paths used on links 128c, 138c, and 158c.

Switch fabric 150c accesses switching database 160c to determine how to route data on each of links 128c, 138c, and 158c for a given communication path. Node 100c further includes interface 140c. Interface 140c couples to overlay network 50 using link 52c. Interface 140c allows management module to access switching database 160c.

In operation, node 100c communicates data with node 100a, node 100f, and subscribers 70 of node 100c. When one of subscribers 70 of node 100c desires to communicate data to data network 20, node 100c receives the data at a particular subscriber port 132c. Then, an associated subscriber card 136c in subscriber card bank 134c transforms the data into a form acceptable to data network 20, assigns the data a communication path, and communicates the data to switch fabric 150c using link 138c. Switch fabric 150c maps the communication path for the data to a new communication path, as determined in switching database 160c, and communicates the data to NIM 110c. Node 100c also receives data through STM 120c on a communication path assigned by node 100f. STM 120c communicates the data to switch fabric 150c, using link 128c. Switch fabric 150c maps the communication path for the data to a new communication path, as determined in switching database 160c, and communicates the data to NIM 110c. NIM 110c places data from switch fabric 150c onto link 122a for communication to node 100a and, eventually, data network 20.

Node 100c can also receive data destined for node 100f and for subscribers 70 of node 100c from data network 20, through node 100a. Data communicated from data network 20 for subscribers 70 of node 100c or for node 100f enters node 100c through port 116c of NIM 110c. From NIM 110c, the data travels to switch fabric 150c over link 158c. Switch fabric 150c maps the communication path for the data, as designated by switching database 160c. Switch fabric 150c then sends the data to either subscriber card bank 134c or STM 120c. If the data is destined for one of subscribers 70 of node 100c, subscriber card bank 134c receives the data and routes it to a particular subscriber card 136c, which transforms the data for communication to an associated subscriber 70. If the data is destined for node 100f, switch fabric 150c routes the data to STM 120c using link 128c. STM 120c transfers the data to link 122c through port 126cb.

In certain embodiments, switch fabric 150c of node 100c acts as a restricted switch. Switch fabric 150c acts as a restricted switch because switch fabric 150c only switches from STM 120c to NIM 110c and from subscribers 70 of node 100c to NIM 110c, and not from STM 120c to subscribers 70 of node 100c or from subscribers 70 of node 100c to subscribers 70 of node 100c. In other embodiments, however, node 100c can perform local switching as well.

Management module 30 can communicate with node 100c using link 52c to access interface 140c. From interface 140c, management module 30 can access switching database 160c. At switching database 160c, management module 30 determines, retrieves, and/or provisions the mapping of the communication paths for switch fabric 150c. Further, management module 30 can interrogate memory 113c of NIM 110c to determine and retrieve the SPID using a link 162c. The SPID in memory 113c of NIM 110c is the identifier for STMs 120 coupled to NIM 110c, STM 120a of node 100a in the arrangement illustrated in FIG. 1A. This allows management module 30 to determine which of nodes 100 subtend node 100c and to store the SPID. Note, because STMs 120 may have more than one port, any reference in the singular to SPID should be understood to include the plural. Further, management module 30 can interrogate memories 123c and 124c of STM 120c to determine and retrieve the NPID using a link 164c. Note, links 162c and 164c can be implemented in hardware or software. The NPID in STM 120c is the identifier for whichever of NIMs 110 couples to STM 120c, NIM 110f of node 100f in the arrangement illustrated in FIG. 1A. This allows management module 30 to determine which of nodes 100 node 100c subtends and to store the NPID. Note, because STMs 120 may have more than one port, any reference in the singular to SPID should be understood to include the plural.

Management module 30 can also communicate the identifiers of NIMs 110 coupled to STM 120c and the identifiers of STMs 120 coupled to NIM 110c to STM 120c and NIM 110c, respectively. This process is known as reverse synchronization. The communication of the SPID to NIM 110c and the NPID to STM 120c can occur, for example, when node 100c corrupts the identifier for STM 120 of subtending node 100 in NIM 110c and the identifier for NIM 110 of subtended node 100 in STM 120c or when node 100c malfunctions and is replaced with a new node 100 that does not possess the SPID and NPID for node 100c.

Although the identifier for NIM 110c and the SPID for subtending node 100 have been shown as being stored at NIM 110c, and the identifier for STM 120c and the NPID for subtended node 100 have been shown as being stored at STM 120c, it should be understood that the identifier for NIM 110c, the SPID for subtending node 100, the identifier for STM 120c, and the associated NPID for subtended node 100 can be stored in switching database 160c, or in any other memory of node 100c. In fact, node 100c may not even be aware that it stores the SPID and/or NPID.

In particular embodiments, data network 20 is an ATM network. In these embodiments, the communication paths for the data are designated by a combination of a virtual path identifier (VPI) and a virtual circuit identifier (VCI). At least one connection identifier, a specific VPI/VCI combination, identifies each subscriber 70 of node 100c. Switch fabric 150c maps the VPI/VCI for data received at switch fabric 150c, including data from STM 120c and NIM 110c, to different VPIs/VCIs based on switching database 160c. For data from subscribers 70 of node 100c, switch fabric 150c creates virtual circuit cross-connects between subscribers 70 of node 100c and NIM 110c. The provisioning of switch fabric 150c is still important in these embodiments to ensure that data from node 100f and subscribers 70 of node 100c do not have conflicting connection identifiers. Once the data reaches node 100a, NIM 110a can provide a DS-n connection, an OC-n connection, or any other type of ATM connection to data network 20.

In some of the embodiments where data network 20 is an ATM network, at least some of subscriber cards 136c are asymmetric digital subscriber line (ADSL) transceiver units-central(ATU-Cs), subscriber card bank 134c contains sixty-four subscriber cards 136c, and node 100c contains four hundred subscriber ports 132c. ATU-Cs transform the data from subscribers 70 into a form acceptable for data network 20 and transform the data from data network 20 into a form acceptable for subscribers 70. In these embodiments, node 100c is oversubscribed, meaning that there are more subscribers 70 of node 100c than node 100c can handle simultaneously.

In other embodiments, less, more, and/or different transformation devices can be used as subscriber cards 136c. For instance, some of the data from subscribers 70 of node 100c may not require transformation because, for example, some of subscribers 70 may send data in a form acceptable to data network 20. Thus, fewer ATU-Cs would be required.

In some of the embodiments where data network 20 is an ATM network, NIMs 110 may only use circuit connections having a VPI of 0–7 because these are the only circuit connections supported in the address space of STMs 120. Note, the circuit connections supported in the address space of STMs 120 can be different from the circuit connections supported in the address space of NIMs 110. In addition, VPI 0 and VPIs 2–7 can support VCIs 0–399, while VPI 1 can support VCIs 0–1599. Further, VPI 1 is used to communicate between the switch fabric of each node 100 and subscribers 70, allowing four permanent virtual circuits (PVCs) per subscriber 70. VPIs 8–235 are reserved for virtual path (VP) traffic only.

FIG. 3A shows a representative mapping table of communication paths between subscribers 70 of node 100c and data network 20 for the embodiments just described. In these embodiments, data network 20 is an ATM network, each node 100 has four hundred subscribers 70, and STMs 120 have an address space restricted to VPI 0–7. Thus, a VPI/VCI combination specifies each communication path. When one of subscribers 70 of node 100c sends data to node 100c, subscriber card bank 134c transforms the data into ATM cells and assigns the data to VPI 1 and one of VCIs 0–1599. After subscriber card bank 134c transforms and sends the data, the data enters switch fabric 150c, which maps the VPI/VCI of the data to a VPI/VCI supported in the address space of STM 120a, which would be on one of VPIs 0–7. Switch fabric 150c then sends the data to NIM 110c, which communicates the data through port 116c, NIM 110c only having one port in these embodiments, using the VPI/VCI assigned in switch fabric 150c. Node 100a receives the data through port 126ab of STM 120a on the VPI/VCI assigned by switch fabric 150c. In node 100a, the switch fabric of node 100a maps the VPI/VCI assigned by switch fabric 150c to a different VPI/VCI. The data is then sent to NIM 110a, which communicates the data through port 116a to data network 20 using the VPI/VCI assigned by the switch fabric of node 100a. Note, the VPI/VCI for data communicated to data network 20 can be any combination supported in the address space of NIM 110a, and the port used on NIM 110a is arbitrary. For data bound for one of subscribers 70 of node 100c, each subscriber 70 defined by a specific VPI/VCI combination between any switch fabrics in subtended communication network 10, the routing occurs in the inverse order of that just discussed.

FIG. 3B shows a representative mapping table of communication paths between subscribers 70 of node 100f and node 100c for the same embodiments. Node 100f receives data from one of subscribers 70 on one of four hundred ports, each subscriber 70 of node 100f having an assigned port. Node 100f then assigns a VPI/VCI for the data. After this, the data travels to the switch fabric of node 100f. The switch fabric of node 100f maps the VPI/VCI to a VPI/VCI supported in the address space of STM 120c. The switch fabric of node 100f then sends the data through port 116fa of NIM 110f using the VPI/VCI assigned in the switch fabric of node 100f. STM 120c of node 100c receives the data through port 126cb on the VPI/VCI assigned by the switch fabric of node 100f. Switch fabric 150c of node 100c then maps the VPI/VCI to a VPI/VCI supported in the address space of STM 120a. The data is then sent to NIM 110c of node 100c for communication to node 100a and, eventually, data network 20.

It is important to note that switch fabric 150c should not use the same VPI/VCI combination for data destined for one of subscribers 70 of node 100c and for data destined for subtending node 100f. Further, switch fabric 150c should not assign a VPI/VCI combination for data destined for data network 20 that is used by node 100a as a connection identifier for one of subscribers 70 of node 100a or data from node 100b. Thus, proper provisioning of the mapping of the virtual connections remains important in these embodiments.

Figures 4, 6:
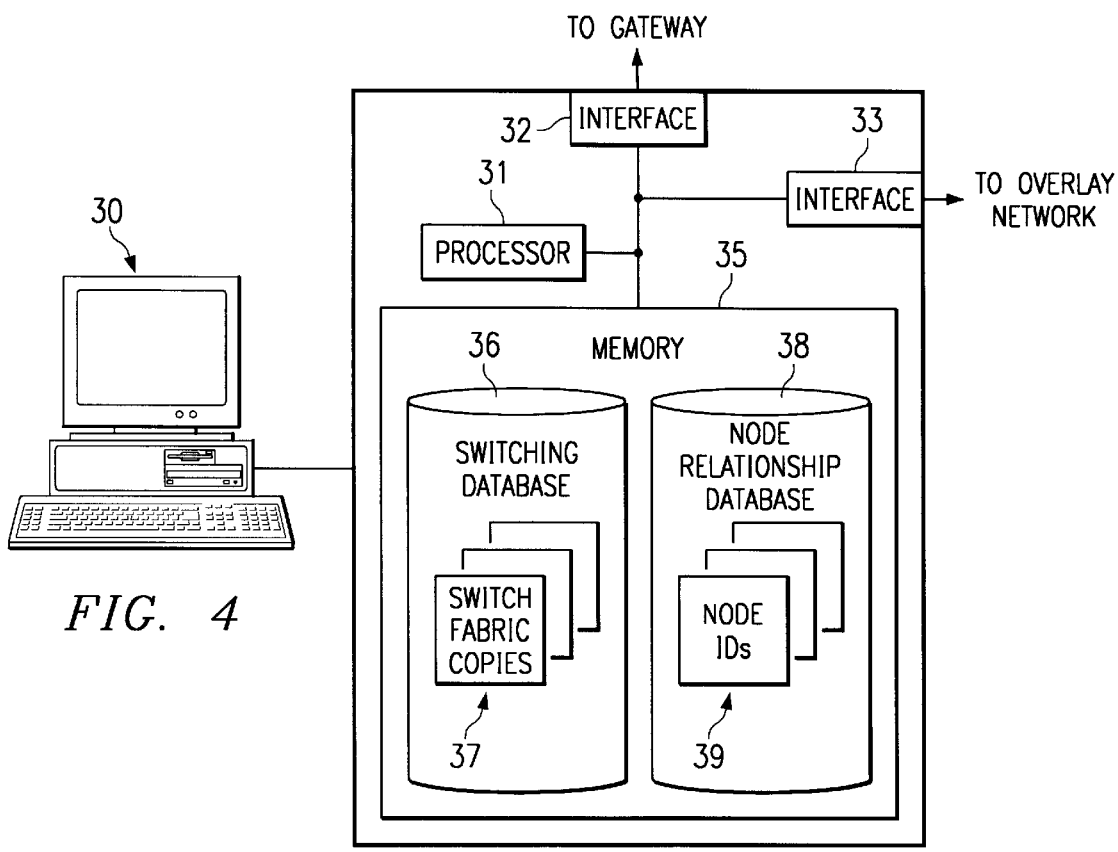
FIG. 4 provides a detailed view of a management module of the subtended communication network.
FIG. 6 shows a table that illustrates the use of the identifiers for subtend modules and network interface modules in different conditions in the subtended communication network.

FIG. 4 provides a detailed view of management module 30 of subtended communication network 10. Management module 30 can be a personal computer (PC), a workstation, a mainframe computer, a server, or any other type of computing or communication device. Management module 30 includes a processor 31 coupled to a memory 35. Memory 35 includes a variety of databases, including switching database 36 and node relationship database 38, and can be random access memory (RAM), a hard disk, a CD-ROM, other magnetic storage media or optical storage media, or any other type of volatile or non-volatile memory. Switching database 36 stores copies 37 of the mapping in each node 100 by storing all or a portion of the contents of the switching database in each node 100. Node relationship database 38 stores node identifiers 39 for each node 100, each node identifier 39 containing an identifier for a particular one of nodes 100 and for any nodes 100 which that particular node 100 subtends or is subtended by. The identifier for nodes 100 that subtend a particular one of nodes 100 would be an SPID to that particular node 100, and the identifiers for nodes 100 that a particular one of nodes 100 subtends would be an NPID to that particular node 100. Management module 30 also includes an interface 32 and an interface 33. Interface 32 allows management module 30 to communicate with nodes 100 through data network 20. Interface 33 allows management module 30 to communicate with nodes 100 through overlay network 50.

In operation, management module 30 can determine the position of each node 100, and hence, the entire subtending relationship between nodes 100, by retrieving the SPIDs from NIMs 110 and the NPIDs from STMs 120. This process is known as synchronization. Further, management module 30 can also store the SPID and the NPID for each node 100 in node identifiers 39 for each node 100, for later recall. Management module 30 can also provision the SPID and the NPID in each node 100 if preprovisioning has not occurred. Once management module 30 determines the subtending relationship between nodes 100, management module 30 can provision the switch fabric in nodes 100. Further, management module 30 can retrieve and store a copy 37 of the provisioned switch fabric of each node 100 in switching database 36.

Later, management module 30 can update, using node identifiers 39, the SPID in each NIM 110 and the NPID in each STM 120. Updating may be necessary if the SPID or NPID become corrupted or if one of nodes 100 is replaced with a new node 100 that does not have the SPID or NPID preprovisioned. This process is known as reverse synchronization. In addition, management module 30 can retrieve the SPID from one of NIMs 110 and/or the NPID from one of STMs 120 if one of node identifiers 39 of node relationship database 38 becomes corrupted. This process is another form of synchronization.

FIG. 5 shows a table that illustrates the content of node relationship database 38. As illustrated, the identifiers in each node identifier 39 are IP addresses for nodes 100 in overlay network 50. Thus, although each node 100 has a unique identifier, STMs 120 and NIMs 110 do not have unique identifiers because they use the identifier of the associated node 100 as their identifier. For example, node 100*c*, NIM 110*c*, and STM 120*c* would all have the same identifier. Each node identifier 39 in node relationship database 38 stores an identifier for a particular one of nodes 100 in an ID slot 40, identifiers for nodes 100 that particular node 100 subtends in an NPID slot 42, and/or an identifier for nodes 100 that subtend that particular node 100 in an SPID slot 44. For example, for node 100*a*, node identifiers 39 for node 100*a* stores the identifier for node 100*a* in ID slot 40 ("123.89.11.6"), the identifier for node 100*b* in NPID slot 42 ("149.41.8.2"), and the identifier for node 100*c* in NPID slot 42 ("95.8.4.80"). Node identifiers 39 for node 100*a* stores the identifiers for node 100*b* and node 100*c* in NPID slot 42, because node 100*a* subtends nodes 100*b* and 100*c*. Note, node identifiers 39 for node 100*a* does not store anything in SPID slot 44 because node 100*a* is not a subtended node. For node 100*b*, node identifiers 39 for node 100*b* stores the identifier for node 100*b* in ID slot 40, the identifier for node 100*a* in SPID slot 44, because node 100*a* subtends node 100*b*, and the identifiers for nodes 100*d* and 100*e* in NPID slot 42, because node 100*b* subtends nodes 100*d* and 100*e*. Node identifiers 39 for node 100*e*, in turn, stores the identifier for node 100*b* in SPID slot 44 because node 100*b* subtends node 100*e*, but stores nothing in NPID slot 42 because node 100*e* is not a subtending node. For node 100*c*, node relationship database 38 stores the identifier for node 100*a* in SPID slot 44 because node 100*a* subtends node 100*c* and stores the identifier for node 100*f* in NPID slot 42 because node 100*c* subtends node 100*f*. Using node relationship database 38, management module 30 can easily determine the subtending relationships between nodes 100.

In other embodiments, management module 30 could use identifiers other than IP addresses to identify nodes 100, such as media access control (MAC) addresses or data link control (DLC) addresses. Thus, the identifiers for nodes 100 can be any designator that can uniquely denote an electronic device in a communication network. In particular embodiments, the identifiers could be more specific than just for a node. For example, each STM 120 and each NIM 110, or even each port of STMs 120 and NIMs 110, could have its own identifier.

FIG. 6 shows a table that illustrates the use of the identifiers for STMs 120 and NIMs 110 in different conditions in subtended communication network 10. In Condition 1, each node 100 stores the NPID and the SPID for nodes 100 that particular node 100 subtends or is subtended by, respectively. Management module 30, however, does not store the identifiers for subtended or subtending nodes 100 of a particular one of nodes 100. In this condition, management module 30 retrieves the NPID and SPID for nodes 100 that particular node 100 subtends or is subtended by and stores them in node identifiers 39 for particular node 100. This process is known as synchronization. Condition 1 can occur, for example, when node identifiers 39 in node relationship database 38 become corrupted, when management module 30 is upgraded, or when one of nodes 100 has been preprovisioned and management module 30 first discovers that node 100.

In condition 2, a particular one of nodes 100 does not store the NPID or SPID for nodes 100 that particular node 100 subtends or is subtended by, respectively, but node identifiers 39 for particular node 100 in management module 30 does. In this condition, management module 30 sends node identifiers 39 for particular node 100 to particular node 100. This process is known as reverse synchronization. Condition 2 can occur, for example, if the identifiers in one of nodes 100 become corrupted or if one of nodes 100 malfunctions and is replaced.

In condition 3, nodes 100 and management module 30 both store the proper identifiers, SPID and/or NPID, for each node 100. In this condition, management module 30 does nothing because subtended communication network 10 is in its normal operating mode.

In condition 4, each node 100 stores an SPID and/or an NPID and management module 30 also stores an SPID and/or an NPID for each node 100, but the SPID and/or the NPID stored at one of nodes 100 and the SPID and/or the NPID stored by management module 30 for that node 100 do not correspond, creating a circular dependency. In this case, management module 30 sets a trap and must resolve the conflict. Condition 4 can occur, for example, if one of nodes 100 is removed from the subtending relationship, an interruption occurs during a modification to one of nodes 100, or one of nodes 100 is preprovisioned incorrectly.

Figure 7A:
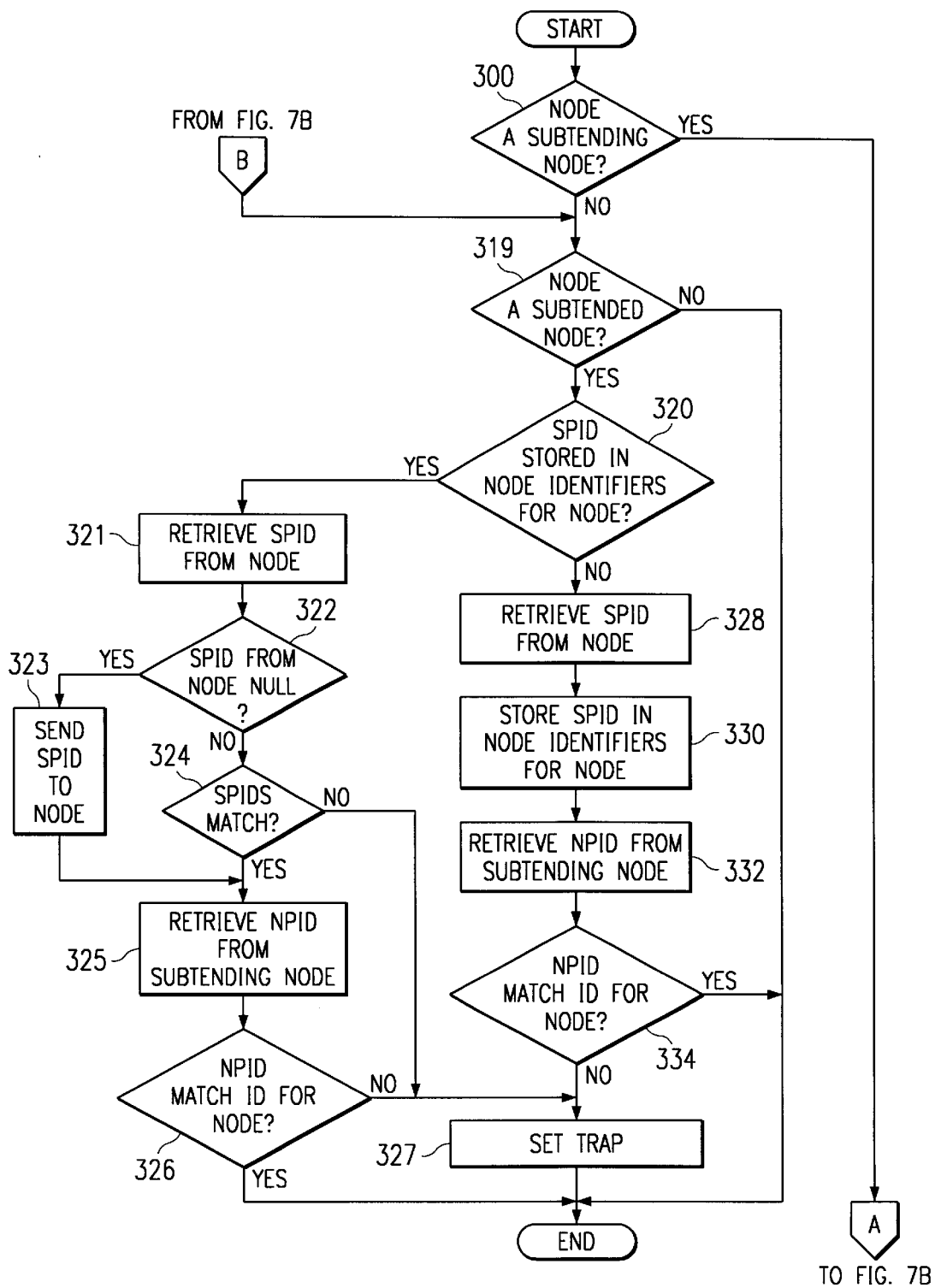
FIG. 7 provides a flowchart that illustrates the synchronization process and the reverse synchronization process between the management module and a node.
Figure 7B:
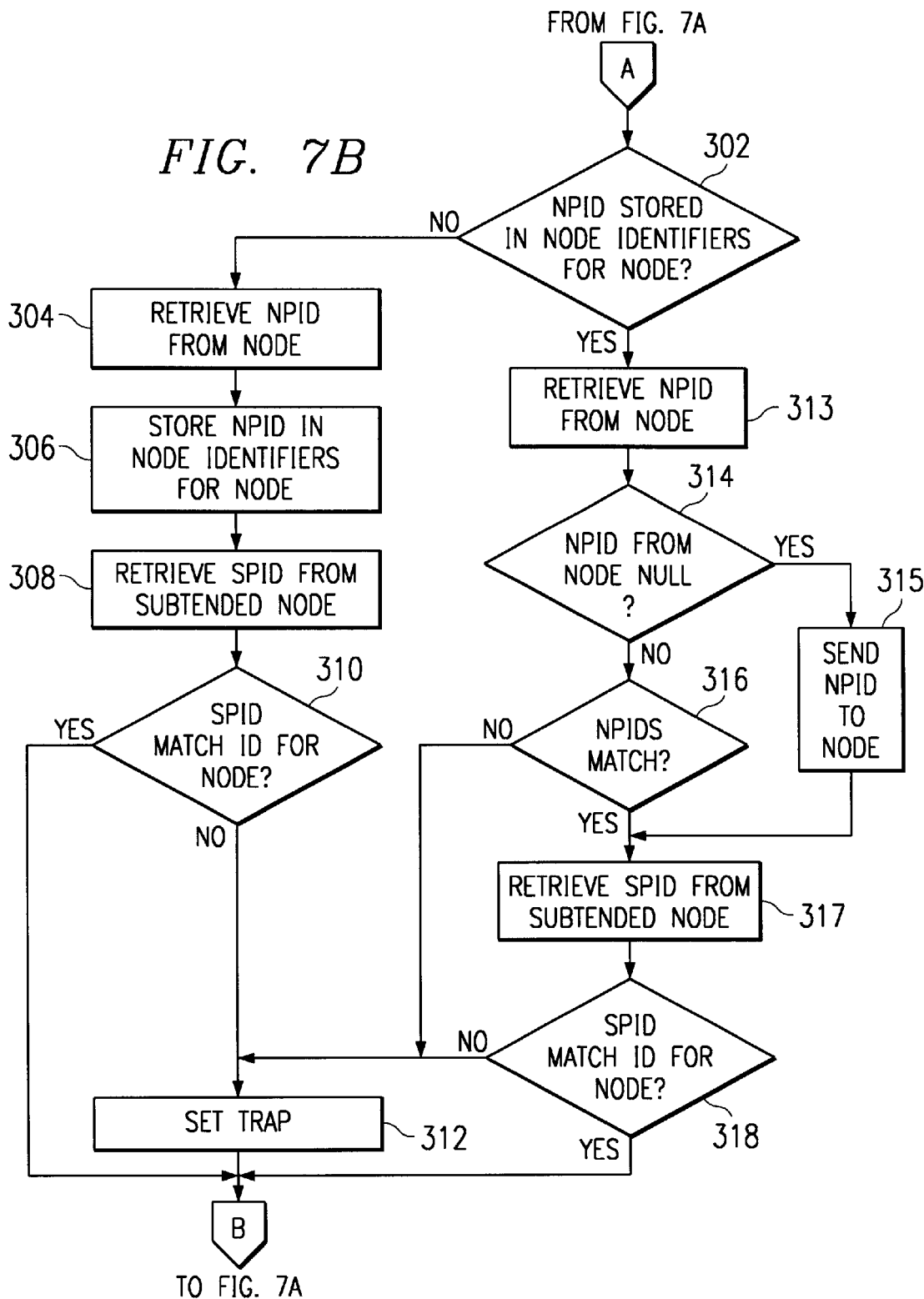

FIG. 7 provides a flowchart that illustrates the synchronization and reverse synchronization processes between management module 30 and one of nodes 100. The flowchart will be discussed using node 100*c* as an example. First, management module 30 determines whether the node of interest, node 100c here, is a subtending node at step 300. Note, node 100c is a subtending node as illustrated in FIG. 1A because node 100c subtends node 100f. Further, because node 100f is subtended by node 100c, node identifiers 39 for node 100c and/or STM 120c of node 100c will store the identifier for NIM 110f of node 100f as an NPID.

Because node 100c subtends one of nodes 100 at step 300, management module 30 determines whether node identifiers 39 for node 100c stores an identifier in NPID slot 42 at step 302. If node identifiers 39 for node 100c does not store an identifier in NPID slot 42, management module 30 retrieves the NPID stored in STM 120c of node 100c at step 304. Management module 30 then stores the NPID from STM 120c in NPID slot 42 of node identifiers 39 for node 100c at step 306. After this, management module 30 retrieves the SPID stored at NIM 110f of node 100f at step 308. If the SPID from NIM 110f matches the identifier in ID slot 40 of node identifiers 39 for node 100c at step 310, then the process proceeds to step 319, which verifies the identifiers for any of nodes 100 that subtend node 100c. If, however, the SPID from NIM 110f does not match the identifier in ID slot 40 of node identifiers 39 for node 100c at step 310, meaning that node 100c and node 100f do not point to each other, then management module 30 sets a trap at step 312. Management module 30 must resolve the ambiguity when step 312 occurs. After the trap is set, the process proceeds to step 319.

Returning to step 302, if node identifiers 39 for node 100c does store an identifier in NPID slot 42, management module 30 retrieves the NPID stored in STM 120c of node 100c at step 313. If management module 30 determines that STM 120c does not have an NPID stored at step 314, management module 30 sends the identifier stored in NPID slot 42 of node identifiers 39 for node 100c to STM 120c of node 100c at step 315. After this, the process proceeds to step 317. But if node 100c does have an NPID stored in STM 120c at step 314, management module 30 determines whether the NPID from STM 120c matches the identifier stored in NPID slot 42 of node identifiers 39 for node 100c at step 316. If the NPID from STM 120c does not match the identifier stored in NPID slot 42 at step 316, management module 30 sets a trap at step 312. Management module 30 must then resolve the ambiguity. If, however, the NPID from STM 120c does match the identifier stored in NPID slot 42 at step 316, management module 30 retrieves the SPID stored in NIM 110f of node 100f at step 317. If the SPID from NIM 110f matches the identifier in ID slot 40 of node identifiers 39 for node 100c at step 318, the process proceeds to step 319. If the SPID from NIM 110f does not match the identifier in ID slot 40 for node 100c, management module 30 sets a trap at step 312. Management module 30 must then resolve the ambiguity. After this, the process proceeds to step 319.

Once the process of verifying the relationship with a subtended node is complete, or if node 100c does not have a subtended node at step 300, management module 30 determines whether node 100c is itself a subtended node at step 319. If one of nodes 100 subtends node 100c, node identifiers 39 for node 100c and/or node 100c will store the identifier for subtending node 100 as an SPID. Note, as illustrated in FIG. 1A, node 100c is subtended by node 100a. If management module 30 determines that node 100c is not a subtended node at step 319, meaning that, for example, node 100c is at the top of the hierarchy, the process ends for node 100c. If, however, node 100c is a subtended node, which it is in FIG. 1A, management module 30 checks whether node identifiers 39 for node 100c has an identifier in SPID slot 44 at step 320. If node identifiers 39 for node 100c does store an identifier in SPID slot 44 at step 320, management module 30 retrieves the SPID in NIM 110c of node 100c at step 321. If management module 30 determines that NIM 110c of node 100c does not store an SPID at step 322, management module 30 sends the identifier in SPID slot 44 of node identifiers 39 for node 100c to NIM 110c of node 100c at step 323. The process then continues at step 325. If, however, NIM 110c of node 100c does contain an SPID at step 322, management module 30 determines whether the SPID from NIM 110c matches the identifier in SPID slot 44 of node identifiers 39 for node 100c at step 324. If the SPID from NIM 110c does not match the identifier in SPID slot 44 of node identifiers 39 for node 100c, management module 30 sets a trap at step 327. Management module 30 must then resolve the ambiguity. After step 327, the process is complete. Returning to step 324, if the SPID from NIM 110c matches the identifier in SPID slot 44 at step 324, management module 30 retrieves the NPID from STM 120a of node 100a at step 325. If the NPID retrieved from node 100a matches the identifier in ID slot 40 of node identifiers 39 for node 100c at step 326, the process ends. If the NPID retrieved from node 100a does not match the identifier in ID slot 40 for node 100c at step 326, management module 30 sets a trap at step 327. Management module 30 must resolve the ambiguity. After step 327, the process ends.

Returning to step 320, if node identifiers 39 for node 100c does not store an identifier in SPID slot 44, management module 30 retrieves the SPID from NIM 110c of node 100c at step 328. Management module 30 then stores the SPID from NIM 110c of node 100c in SPID slot 44 of node identifiers 39 for node 100c at step 330. After this, management module 30 retrieves the NPID from STM 120a of node 100a at step 332. If the NPID retrieved from STM 120a matches the identifier in ID slot 40 of node identifiers 39 for node 100c at step 334, the process ends. However, if the NPID retrieved from STM 120a does not match the identifier in ID slot 40 of node identifiers 39 for node 100c, management module 30 sets a trap at step 327. Management module 30 must resolve the ambiguity. After step 327, the process ends.

Management module 30 may repeat the process illustrated by the flow chart in FIG. 7 for each of nodes 100 in subtended communication network 10. By this process, management module 30 can assure that all nodes 100 properly point to each other. Note, there are a myriad of ways to perform the process in FIG. 7.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A subtended communication network, comprising:
 a first node servicing a plurality of first subscribers and having a subtend module and a corresponding first identifier, the first node operable to store a second identifier corresponding to a second node coupled to the subtend module;
 a second node servicing a plurality of second subscribers and having a network interface module and corresponding second identifier, the second node operable to store the first identifier corresponding to the first node coupled to the network interface module; and a management module coupled to the first node and the second node, the management module operable to determine a subtending relationship between the first node and the second node, wherein the subtending relationship indicates that all network data transmitted to the network interface module of the second node passes through the first node, by retrieving the first identifier from the second node and the second identifier from the first node.

2. The communication network of claim 1, wherein:

the first node associates the second identifier with a subtend port on the subtend module; and the second node associates the first identifier with a network port on the network interface module.

3. The communication network of claim 1, further comprising a data network coupled to the first node, and wherein the first node further comprises a network interface module coupled to the data network, the network interface module operable to:

communicate first subscriber data associated with the first subscribers serviced by the first node with the data network; and communicate second subscriber data associated with the second subscribers serviced by the second node with the data network.

4. The communication network of claim 1, wherein the first node further comprises a network interface module operable to:

communicate first subscriber data associated with the first subscribers serviced by the first node using first virtual circuit assignments; and communicate second subscriber data associated with the second subscribers serviced by the second node using second virtual circuit assignments.

5. The communication network of claim 1, further comprising an overlay network that couples the management module to the first node and the second node, wherein the first identifier and the second identifier are Internet Protocol addresses.

6. The communication network of claim 1, wherein the management module comprises a memory operable to store subtending information for the first node and the second node, the management module operable to initiate a synchronization process if the management module does not contain complete subtending information for the first node or the second node.

7. The communication network of claim 1, wherein the management module comprises a memory operable to store subtending information for the first node and the second node, the management module operable to communicate subtending information to the nodes for storage.

8. The communication network of claim 1, further comprising a second management module coupled to the first node and the second node, the second management module operable to determine the subtending relationship between the first node and the second node.

9. A subtending node coupled to a subtended node in a subtended communication network, the subtending node comprising:

a plurality of subscriber ports coupled to a plurality of subscribers receiving communication service from the subtending node;

a subtend module coupled to a subtended node and operable to store an identifier for the subtended node and operable to communicate the identifier to a management module to be used in determining a subtending relationship between the subtending node and the subtended node, wherein the subtending relationship indicates that all network data transmitted to the subtended node passes through the subtending node;

a network interface module coupled to a data network; and a switch operable to receive first subscriber data from the subscriber ports and second subscriber data from the subtend module, the switch operable to communicate the first subscriber data and the second subscriber data to the network interface module for communication over the data network.

10. The node of claim 9, wherein:

the node communicates the first subscriber data using first virtual circuit assignments; and the node communicates the second subscriber data using second virtual circuit assignments.

11. The node of claim 9, wherein the node synchronizes with a management module coupled to the node by sending an identifier for the subtended node to the management module.

12. The node of claim 9, wherein the node reverse synchronizes with a management module coupled to the node by receiving an identifier for the subtended node from the management module.

13. The node of claim 9, wherein the node couples to an overlay network in which the identifier for the subtended node is an Internet Protocol address of the subtended node.

14. The node of claim 9, wherein the node synchronizes with a second management module coupled to the node by sending an identifier for the subtended node to the second management module.

15. A method for managing a subtended communication network, the communication network including a first node and a second node, the method comprising:

coupling a subtend module of a first node to a network interface module of a second node;

storing, at the first node, a second identifier corresponding to the second node;

storing, at the second node, a first identifier corresponding to the first node; and communicating the first identifier and the second identifier to a management node to be used to determine a subtending relationship between the first node and the second node, wherein the subtending relationship indicates that all network data communicated to the second node passes through the first node.

16. The method of claim 15, further comprising the following steps performed before the steps of storing:

determining, at a management module remote from the first node and the second node, the subtending relationship between the first node and the second node;

communicating the second identifier to the first node for storage; and communicating the first identifier to the second node for storage.

17. The method of claim 15, further comprising the following steps performed before the steps of storing:

determining, at a management module remote from the first node and the second node, the subtending relationship between the first node and the second node;

communicating the second identifier to the first node for storage;

associating the second identifier with a port of a subtend module on the first node;

communicating the first identifier to the second node for storage; and associating the first identifier with a port of a network interface module on the second node.

18. The method of claim 15, further comprising determining, at a management module remote from the first node and the second node, the subtending relationship between the first node and the second node by retrieving the first identifier from the second node and the second identifier from the first node.

19. The method of claim 15 further comprising:

communicating first subscriber data associated with a plurality of first subscribers serviced by the first node over first virtual circuits; and communicating second subscriber data associated with a plurality of second subscribers serviced by the second node over second virtual circuits.

20. The method of claim 15, further comprising determining the subtending relationship between the first node and the second node at a second management module remote from the first node and the second node by retrieving the first identifier from the second node and retrieving the second identifier from the first node.

21. The method of claim 15, further comprising:

removing the first node from the communication network; and updating the first identifier at the second node.

22. The method of claim 15, further comprising:

coupling a management module to the first node and the second node using an overlay network;

using the first identifier as the address for the first node in the network; and using the second identifier as the address for the second node in the network.

23. A method for managing a subtended communication network, the communication network comprising a plurality of nodes and a management module, the method comprising:

communicating, from a management module during a first mode, a subtending relationship between the first node and the second node, wherein the subtending relationship indicates that all network data transmitted to the second node passes through the first node; and receiving, at the management module during a second mode, the subtending relationship from the first node and the second node.

24. The method of claim 23, where communicating further comprises:

communicating to the second node a first identifier corresponding to the first node; and communicating to the first node a second identifier corresponding to the second node.

25. The method of claim 24, further comprising:

storing the first identifier at the second node; and storing the second identifier at the first node.

26. The method of claim 24, further comprising:

storing the first identifier at a network interface of the second node; and storing the second identifier at a subtend module of the first node.

27. The method of claim 23, wherein receiving comprises:

receiving, from the second node, a first identifier corresponding to the first node;

receiving, from the first node, a second identifier corresponding to the second node; and storing the first identifier and the second identifier at the management module.

28. The method of claim 23, wherein:

the steps of communicating and receiving are performed using an overlay network coupling the management module to each of the nodes; and the first identifier and the second identifier are network addresses in the overlay network.

29. The method of claim 23, further comprising communicating the subtending relationship from the first node and the second node to a second management module.

30. The method of claim 23, further comprising:

communicating first subscriber data associated with a plurality of first subscribers serviced by the first node over first virtual circuits; and communicating second subscriber data associated with a plurality of second subscribers serviced by the second node over second virtual circuits.

31. The method of claim 23, further comprising:

removing one of the plurality of nodes from the communication network; and communicating a revised subtending relationship from the management module to the nodes that remain in the subtended network.

32. A computer program product for managing a subtended communication network, the computer program product being embodied in a computer readable medium and comprising computer instructions for:

communicating, from a management module during a first mode, a subtending relationship between the first node and the second node, wherein the subtending relationship indicates that all network data transmitted to the second node passes through the first node; and receiving, at the management module during a second mode, the subtending relationship between the first node and the second node.

33. The computer program product of claim 32, where communicating further comprises:

communicating to the second node a first identifier corresponding to the first node; and communicating to the first node a second identifier corresponding to the second node.

34. The computer program product of claim 32, further comprising computer instructions for:

storing the first identifier at the second node; and storing the second identifier at the first node.

35. The computer program product of claim 32, further comprising computer instructions for:

storing the first identifier at a network interface of the second node; and storing the second identifier at a subtend module of the first node.

36. The computer program product of claim 32, wherein receiving comprises:

receiving, from the second node, a first identifier corresponding to the first node;

receiving, from the first node, a second identifier corresponding to the second node; and storing the first identifier and the second identifier at the management module.

37. The computer program product of claim 32, wherein:

the steps of communicating and receiving are performed using an overlay network coupling the management module to each of the nodes; and the first identifier and the second identifier are network addresses in the overlay network.

38. The computer program product of claim 32, further comprising computer instructions for communicating the subtending relationship from the first node and the second node to a second management module.

39. The computer program product of claim 32, further comprising computer instructions for:

communicating first subscriber data associated with a plurality of first subscribers serviced by the first node over first virtual circuits; and communicating second subscriber data associated with a plurality of second subscribers serviced by the second node over second virtual circuits.

40. The computer program product of claim 32, further comprising computer instructions for:

removing one of the plurality of nodes from the communication network; and communicating a revised subtending relationship from the management module to the nodes that remain in the subtended network.

41. A system for managing a subtended communication network, comprising:

means for communicating, from a management module during a first mode, a subtending relationship between the first node and the second node, wherein the subtending relationship indicates that all network data transmitted to the second node passes through the first node; and means for receiving, at the management module during a second mode, the subtending relationship between the first node and the second node.

* * * * *